(12) United States Patent
MacQuarrie et al.

(10) Patent No.: US 11,749,129 B2
(45) Date of Patent: Sep. 5, 2023

(54) SYSTEM AND METHOD FOR VIRTUAL REALITY VEHICLE TRAINING FIELD

(71) Applicant: ADGA GROUP CONSULTANTS INC., Ottawa (CA)

(72) Inventors: Don MacQuarrie, Perth Road (CA); Danny Warren, Amherstview (CA); Geoff McLeod, Yarker (CA)

(73) Assignee: ADGA GROUP CONSULTANTS INC., Ottawa (CA)

( * ) Notice: Subject to any disclaimer, the term of this patent is extended or adjusted under 35 U.S.C. 154(b) by 689 days.

(21) Appl. No.: 16/346,827

(22) PCT Filed: Jan. 31, 2018

(86) PCT No.: PCT/CA2018/050110
§ 371 (c)(1),
(2) Date: May 1, 2019

(87) PCT Pub. No.: WO2018/141056
PCT Pub. Date: Aug. 9, 2018

(65) Prior Publication Data
US 2019/0347951 A1    Nov. 14, 2019

Related U.S. Application Data

(60) Provisional application No. 62/453,301, filed on Feb. 1, 2017.

(51) Int. Cl.
*G09B 9/02* (2006.01)
*G06F 3/01* (2006.01)
(Continued)

(52) U.S. Cl.
CPC ............ *G09B 9/02* (2013.01); *G06F 3/011* (2013.01); *G09B 9/003* (2013.01); *G09B 9/05* (2013.01); *G09B 9/08* (2013.01)

(58) Field of Classification Search
CPC . G09B 9/02; G09B 9/003; G09B 9/05; G09B 9/08; G09B 9/04; G06F 3/011
See application file for complete search history.

(56) References Cited

U.S. PATENT DOCUMENTS 6,106,297 A    8/2000  Pollak et al.
8,645,112 B2   2/2014  Falash et al.
(Continued)

FOREIGN PATENT DOCUMENTS

CA        2925531       10/2016
CN     100589148 C       2/2010
(Continued)

OTHER PUBLICATIONS

Wasfy, A. et al. "Intelligent virtual environment for processing training", Advances in Engineering Software, vol. 35, Issue 6, (Jun. 2000).

(Continued)

*Primary Examiner* — Andrey Belousov
(74) *Attorney, Agent, or Firm* — Greer, Burns & Crain, Ltd (57) ABSTRACT

The present invention provides a virtual reality vehicle and/or equipment training system and platform within contextually relevant simulated environments. The system and platform will simulate accurate vehicle and/or equipment dynamics of various vehicles through vehicle modules. The simulated vehicles and/or equipment will be placed within contextually relevant simulated physical environments, and will be able to communicate with other vehicle modules and users of the platform. The system and platform allows for multiple simulated vehicles and/or equipment to exist and interact in the same simulated physical environment. The system allows for rapid development of trainers for different vehicles, different equipment, different physical environments, and different scenarios. The characteristics of the (Continued)

system which most directly enable this rapid development are the use of commodity computer hardware, use of common interface-deployment toolkits, and use of a data-driven architecture where participating modules are generic until being configured at runtime. The virtual reality vehicle and/or equipment training system and platform is also capable of responsiveness measurement and assessment of a simulator occupant.

20 Claims, 6 Drawing Sheets

(51) Int. Cl.
*G09B 9/00* (2006.01)
*G09B 9/05* (2006.01)
*G09B 9/08* (2006.01)

(56) References Cited

U.S. PATENT DOCUMENTS

| | | | |
|---|---|---|---|
| 2003/0132283 A1* | 7/2003 | Hobgood | G07F 7/1008 235/380 |
| 2009/0099824 A1* | 4/2009 | Falash | H04L 67/38 703/8 |
| 2009/0220929 A1 | 9/2009 | Daniel | |
| 2013/0083063 A1* | 4/2013 | Geisner | G09G 5/363 345/633 |
| 2015/0050623 A1 | 2/2015 | Falash et al. | |
| 2016/0019808 A1* | 1/2016 | Chavez | G09B 9/302 434/38 |
| 2016/0071393 A1* | 3/2016 | Kaplan | A61B 5/352 340/539.12 |
| 2017/0312517 A1* | 11/2017 | Phillips | G09B 9/08 |

FOREIGN PATENT DOCUMENTS

| | | |
|---|---|---|
| WO | WO-2017-153305 A1 | 9/2010 |
| WO | WO-2017-122944 A1 | 7/2017 |

OTHER PUBLICATIONS

Canadian Office Action, CA Application No. 3,038,222, Canadian Intellectual Property Office, dated Aug. 8, 2019, 11 pages.
International Search Report, International Application No. PCT/CA2018/050110, dated Apr. 16, 2018, 3 pages.
Canadian Office Action for Canadian Application No. 3038222, dated Jun. 18, 2019, 10 pages.
Supplementary European Search Report, EP Application No. 18 74 7441, dated Aug. 27, 2020, 2 pages.

* cited by examiner

SYSTEM AND METHOD FOR VIRTUAL REALITY VEHICLE TRAINING FIELD

RELATED APPLICATIONS

This application is a 35 U.S.C. § 371 national phase application of PCT/CA2018/050110 (WO-2018/141056-A1) filed on Jan. 31, 2018, entitled "System and Method for Virtual Reality Vehicle Training Field", which is a PCT application of U.S. Provisional Applicaton No. 62/453,301 filed on Feb. 1, 2017, which is incorporated herein by reference in its entirety.

FIELD

The present invention pertains to the field of training platforms and in particular to a virtual reality based vehicle and equipment training platform with cross-platform functionality.

BACKGROUND

Training is required in order to learn how to properly operate a vehicle and/or equipment. This training is particularly important when the vehicle and/or equipment is complex to control, or involves dangerous learning conditions. In order to subvert the issues that can accompany training that is dangerous or complex, virtual reality (also referred to as "VR" herein) based training can be used. The process and procedures involved in operating complex vehicles and/or equipment may be taught and reinforced in a space in which the consequences of mistakes have far less negative repercussions.

VR training for vehicle training is usually enacted by full motion or 6 degrees of axis high fidelity simulators, which are vehicle-specific devices designed to replace the actual vehicles they are simulating. These simulators are of high cost, not portable, require dedicated facilities or physical infrastructure, require large amounts of mechanical maintenance, and are of such technical complexity that they require dedicated and sophisticated technical support to operate and maintain.

There are very few low-to-medium fidelity and low-cost VR vehicle training simulators available in the market today. This is due to the bespoke nature of creating these simulators. Significant development effort and time are required to create lower fidelity and lower cost VR trainers as they are exclusively "one-off" solutions for specific vehicles including the custom interfaces, which represent all of the major control systems for these vehicles. These vehicle-specific virtual trainers cannot be repurposed or are not applicable to other virtual trainers.

VR training simulators are limited to training the simulator occupants on a single vehicle. The simulator is mechanically designed to replicate a particular vehicle with software being designed to provide training on a particular vehicle. Generally VR training simulators do not provide flexibility in vehicle, specification and VR environment in which the simulator is training.

VR training simulators monitor and assess the reaction of a simulator occupant by recording the successes and failures of the occupant in response to the simulator scenario. These types of assessments alone are not able to measure and/or assess the likely response of a simulator occupant.

Therefore there is a need for a commercially available vehicle training platform that can achieve rapid and repeated prototyping, can provide low-to-medium fidelity and low cost vehicle simulators, is comprised of commodity computer hardware, and has flexibility with vehicle and virtual reality environments that the platform can be used with, and which is capable of responsiveness measurement and assessment of a simulator occupant.

This background information is provided to reveal information believed by the applicant to be of possible relevance to the present invention. No admission is necessarily intended, nor should be construed, that any of the preceding information constitutes prior art against the present invention.

BRIEF SUMMARY

An object of the present invention is to provide a system and method for virtual reality vehicle and equipment training. In accordance with an aspect of the present invention, there is provided a vehicle training network configured to facilitate and coordinate training on vehicles and equipment; at least one vehicle module configured to represent a type of vehicle or equipment being trained on, and configured to communicate within the vehicle training network comprising: a vehicle module user interface configured to manage and facilitate vehicle and equipment training; and a vehicle module database configured to store information related to the at least one vehicle module; at least one central vehicle training control module configured to facilitate the sharing of resources within the vehicle training network, capable of communication within the vehicle training network, and configured to allow for participation of at least one vehicle module in vehicle or equipment training within the vehicle training network comprising: a simulation module configured to recreate and represent vehicle and equipment behaviour for simulated vehicles and equipment within the at least one vehicle module, to receive and translate vehicle training network user inputs from various simulated vehicle and equipment types for representation within a simulated physical environment, to receive and translate terrain and environmental conditions from within a simulated physical environment, wherein these inputs and conditions affect at least one vehicle module connected to the vehicle training network; a vehicle training administrator control interface configured to facilitate vehicle network control; and at least one centralized vehicle training control module database configured to store information related to the central vehicle training control module and vehicle training network; and at least one vehicle training administrator able to access, engage with, and control at least one vehicle training control module.

In accordance with another aspect of the present invention, there is provided a virtual reality training computing system that is capable of measuring and/or assessing characteristics of a vehicle module user comprising: at least one responsiveness measurement device attached to the virtual reality training system user, at least one responsiveness measurement assessment module capable of assessing responsiveness measurement data of a virtual reality training system user against responsiveness data standards, such responsiveness data standards comprising: existing responsiveness standards, historical responsiveness data collected by the responsiveness monitoring system, and responsiveness standards developed by the responsiveness monitoring system, and at least one database capable of storing responsiveness measurement and assessment data.

In accordance with another aspect of the present invention, there is provided a virtual reality training computing system comprising a microprocessor, a memory, and a communication interface and configured to provide: services, templates, and abstraction to a specific implementation of the system; a computer-agnostic training network facilitating inter-module communication; a base component from which specific components of the system are derived; a component controller; a communication component; a simulated virtual environment; a simulation of audio, and physics not otherwise available through the specific simulation engine; a simulation-agnostic control interface; a simulation-agnostic asynchronous communication protocol; and a common user interface for trainees, trainers, and administrators utilizing commodity hardware.

BRIEF DESCRIPTION OF THE FIGURES

Embodiments of the present invention will be better understood in connection with the following Figures, in which.

DETAILED DESCRIPTION

Unless defined otherwise, all technical and scientific terms used herein have the same meaning as commonly understood by one of ordinary skill in the art to which this invention belongs.

Virtual Reality Vehicle Training System/Platform Overview

The present invention provides a virtual reality vehicle training (also referred to as "VRVT" herein) system and platform. The VRVT platform is supported by a vehicle training network (also referred to as "VTN" herein), which provides access to at least one vehicle module (also referred to as "VM" herein), and at least one central vehicle training control module (also referred to as "CVTCM" herein). A vehicle trainee (also referred to as a "VT" herein) will access a VM, which is configured to represent a specific vehicle, and which is capable of communication within the VTN. The VT will be able to participate in vehicle training using a vehicle module user interface (also referred to as a "VMUI" herein), which is part of the VM. A vehicle training administer (also referred to as a "VTA" herein) will access the CVTCM, which facilitates the sharing of resources within the VTN, is capable of communication within the VTN, and is configured to allow for participation of at least one VM in vehicle training within the VTN. The VTA will be able to manipulate and control the vehicle training through the vehicle training administer control interface (also referred to as "VTACI" herein) portion of the CVTCM. The VTACI will also allow the VTA to control and manipulate a simulation module (also referred to as "SI" herein), which is also part of the CVTCM. The SI is capable of recreating and representing vehicle dynamics for simulated vehicles within the VM, to receive and translate VTN user inputs from simulated vehicles for representation within a simulated physical environment, to receive and translate terrain and environmental conditions from within a simulated physical environment, wherein these inputs and conditions affect at least one VM connected to the VTN. Information related to or generated by the VTN, VM, VT, CVTCM, SI, VTACI, and VTA during a training simulation is optimally stored within a VRVT database. The VTA may impose transactional fees upon at least one VRVT system user for use of at least some portion of the VRVT system.

In one embodiment a VT will be trained on a vehicle including, but not limited to military vehicles, emergency service vehicles, industrial vehicles, cranes, mining vehicles, agricultural vehicles, constructions vehicles, trucks, automobiles, planes, helicopters, and other vehicles as would be understood by someone skilled in the art.

In an additional embodiment, a VT will be trained on specific equipment used within the vehicle, or equipment used within the military industry, emergency service industry, industrial industry, mining industry, agricultural industry, constriction industry, or otherwise as would be understood by someone skilled in the art. References to vehicle training herein also contemplate equipment training.

In one embodiment a VT may be an individual, group of individuals, partnership, group, or otherwise as would be understood by someone skilled in the art, seeking to be trained on a vehicle.

In another embodiment a VTA may be an individual, vehicle trainer, group of individuals, partnership, corporation, government body, automated entity such as a computing network, some combination thereof, or otherwise as would be understood by someone skilled in the art.

In one embodiment the platform and system may be run automatically by a computing network, and will not require manual administration or control. The platform and system may be monitored manually or automatically to ensure the functionality and performance of the system during the period in which the system is automatically controlled.

Vehicle Module

In one embodiment the VM will be configured to represent a vehicle, and will utilize a VMUI configured to facilitate vehicle training and a vehicle module database configured to store information related to the VM. The VM will be capable of communication within the VTN. There may be multiple VMs running within the VTN simultaneously.

In one embodiment the VMs may consist of a variety of specific role-based positions within the vehicle, which is being simulated for VT training. For example, in the context of a military vehicle, the VT VMs may include driver, gunner, and commander vehicle positions. The VT VMs are responsible for presenting controls and views to the VTs, and capturing VT control actuations. Any VT VM is capable of presenting any desired controls and views to a VT, where the choice of controls and views is configurable and determined at runtime. The VT VMs also provide both two dimensional and three dimensional views in the appropriate VM displays. These VMs also capture control actuations and communicate them to the CVTCM via the VMUI, they send commands to the simulated environment via the simulation module, and update displays based on events received from the CVTCM.

In one embodiment a VM may be specialized to accommodate a vehicle training instructor. The instructor may be responsible for launching the system through the instructor VM, or through a request to the CVTCM. The instructor VM may contains simulated environment scenarios and may also execute these scenarios. The instructor will utilize a specialized instructor VMUI required for a training Instructor. The instructor VM may also comprise sub-modules responsible for session control, vehicle monitoring and control, target selection, VT monitoring, and other functionality as would be understood by someone skilled in the art. The instructor may communicate directly with other VMs, or the CVTCM via the instructor VMUI.

In another embodiment a third party entity may become part of a training instance. These third party entities may be, but are not limited to individual, vehicle trainer, scenario author, training reviewer, training assessor, group of individuals, partnership, corporation, government body, automated entity such as a computing network, some combination thereof, or otherwise as would be understood by someone skilled in the art. A VM may be specialized to accommodate a third party entity in a similar way to which a VM is specialized for an instructor as described herein.

In one embodiment, the VM will have a configuration, which tells the VT and VTN what vehicle type is being modeled, and the station's role in the VTN. Any VM is capable of assuming any model and role at runtime, based on this configuration data.

In another embodiment, the VM will keep track of its state, which mainly consists of the status of its components and what connections have been made with other VTN users, such as other VM's of the CVTCM. The VM creates a vehicle model, based on the vehicle type, and sets the state.

In an additional embodiment the VMUI creates a command interface for the VT to listen for commands from other VTN users and to send their own commands as needed. Commands are sent and received through the VMUI using a computer network protocol which is both computer language agnostic and system application agnostic; the same protocol is used for all VTN uses, regardless of the vehicle, environment, and scenario being presented.

In one embodiment the VM has a scenario library, with one or more scenarios. The VM has a simulation instance, to handle running and loading the simulation, receiving simulation events and sending simulation commands. Simulation events and commands are abstractions of the functionality normally employed within visual simulation systems, in order to allow different simulation software to be used within the system.

In another embodiment the VM has access to a simulation of the external physical environment. This simulation will vary depending on the desired vehicle training environment, but normally consists of one of several commercially-available visual simulation applications.

In another embodiment the VMUI handles all hardware devices and graphic user interfaces (also referred to as a "GUI" herein). It has a set of controls and views. A control may be implemented through a GUI widget providing the physical actuation and responses of a control surface, or some other implementation method as would be understood by someone skilled in the art. A view may be implemented through a GUI widget with a corresponding simulated environment window, or some other implementation method as would be understood by someone skilled in the art.

In another embodiment the VMUI creates a control interface for the VT to control the vehicle within the VTN, and to interact with other VTN users as needed. Vehicle control is sent and received through the VMUI using a computer network protocol which is both computer language agnostic and system application agnostic; the same protocol is used for all VTN uses, regardless of the vehicle, environment, and scenario being presented.

Central Vehicle Training Control Module

In one embodiment the CVTCM is configured to facilitate the sharing of resources within the VTN, capable of communication within the VTN, and configured to allow for participation of at least one VM in vehicle training within the VTN. The CVTCM will utilize a simulation module, VTACI, and CVTCM database configured to store information related to the CVTCM and VTN.

In an additional embodiment the CVTCM may incorporate all of the capabilities, functionality, and components of a VM as described herein.

In one embodiment the CVTCM may utilize different types of data structures to execute, control and run the system. The data structures utilized include but are not limited to scenarios, scenario missions, system configurations, system states, vehicle states and otherwise as would be understood by someone skilled in the art.

In another embodiment a scenario data structure consists of all information required to execute a system session. It makes reference to a simulation scenario mission file, a system configuration, and a vehicle state.

In an additional embodiment a scenario mission file contains all information needed for the simulated environment. It includes terrain information, environmental effects, time of day, and locations of all objects, vehicles, and avatars in the simulation.

In another embodiment a system configuration data structure contains information about the various system stations. It includes the vehicle model to be employed, the role of each VM, the networking information for each VM, and assigns each VM to a corresponding "seat" in the system model.

In another embodiment the system state data structure contains information about the running session, including which VMs are launched and connected, which simulation instances are connected, and the state of the simulation, for example if the simulation is running or paused.

In an additional embodiment the vehicle state data structure contains information about the modeled vehicle. It includes the position of all controls and the operability of any simulated vehicle system which can be controlled.

In one embodiment the VTACI will allow the VTA to control the VTN, VMs and training simulation—the VTA will be able to manipulate and control the CVTCM through the VTACI. The CVTCM is responsible for maintaining the state of the system, and also the state of the simulated environment scenario, which is being utilized. The CVTCM maintains the vehicle model and state, updates the state based on inputs from the other VMs, and communicates the updated state to all VMs via the VTACI. The CVTCM may receive a scenario from an instructor VM and launch all VT VMs as a result. The CVTCM may also directly launch all VT VMs without the need for a request from an instructor VM. The CVTCM sends configuration to all VMs.

In another embodiment the VTA may be a vehicle training instructor. The instructor may be responsible for launching the system through the CVTCM. The CVTCM contains simulated environment scenarios and may also execute these scenarios. The instructor may utilize a specialized VTACI required for a training Instructor. The CVTCM may also comprise sub-modules responsible for session control, vehicle monitoring and control, target selection, VT monitoring, and other functionality as would be understood by someone skilled in the art. The instructor may communicate directly to the VMs via the VTACI.

In another embodiment although an instructor VM may be used to select and launch the system, the actual control may be maintained through the CVTCM. This allows all state information to be maintained in a single location, allows for training systems which do not require an instructor VM, and also removes the instructor VM as a potential point of system failure.

In one embodiment the simulation module will be configured to recreate and represent vehicle dynamics for simulated vehicles within a VM, to receive and translate VTN user inputs from simulated vehicles for representation within a simulated physical environment, to receive and translate terrain and environmental conditions from within a simulated physical environment, and other functionality as would be understood by someone skilled in the art. The VTN user inputs and conditions may affect the training scenario, and may alter the state of a VM connected to the VTN.

In an additional embodiment the simulation module is responsible for controlling the system and reacting to events which originate in the simulation scenario. It may also maintain at least one VTN interface, which may be used to communicate with VMs.

In another embodiment incoming commands to the simulation module are placed in a command queue, and are parsed and executed on each simulation step, through the use of an application program interface. Simulation events are intercepted by an event handler and passed to a relevant VM for application by the VM in question.

Responsiveness Assessment of Vehicle Trainees

In one embodiment the VRVT system and platform is able to assess the VT using responsiveness measurements. These assessments may be used to determine VT characteristics, such as but not limited to VT ability to operate a vehicle, VT behavioral risks associated with operating a vehicle, how the VT will react within a specific scenario, insurance/financial risks associated with the VT, and other VT characteristics.

In one embodiment, the responsiveness measurements used to assess the VT will be attained through the monitoring of certain characteristics including but not limited to hand speed, movement, movement bias, movement time, pupil dilation, reaction time, posture, brain waves, brain wave character, perspiration, amongst others. The VTs responsiveness measurements may be monitored during VRVT using responsiveness monitoring devices such as but not limited to headbands, sensors, body monitors, machines, microchips, and other devices as would be understood by someone skilled in the field. These devices may be worn by a VTN user during a specific VRVT scenario.

In another embodiment, responsiveness measurements as measured and stored during VRVT within a responsiveness measurement and assessment database, will be assessed by a responsiveness measurement assessment module capable of comparing responsiveness measurement data of a VTN user, against responsiveness standards developed by the responsiveness monitoring system, historical responsiveness data collected by the responsiveness monitoring system, and/or stored responsiveness measurement data, to predict behavior of a VTN user. The VRVT combined with the assessment of responsiveness measurements could be adapted to apply to other purposes besides vehicle training such as but not limited to rehabilitation, diagnosis, risk assessment, cognitive assessment (including cognitive impairment), insurance fitness, athletic training, accreditation, social interaction, leisure activity or otherwise as would be understood by someone skilled in the art.

In another embodiment, the VT responsiveness measurement monitoring devices may be paired with non-invasive brain-computer interface (also referred to as "BCI" herein) technology, including but not limited to electroencephalography (also referred to as "EEG" herein) based BCI and non-EEG based BCI, which allows the VT to participate in a form of VRVT, in which the VT learns how to operate a vehicle using brain control.

In one embodiment, a VTN provider may collect and store responsiveness measurements of VTN users. The VTN provider will be able to compare the responsiveness measurements to existing or developed responsiveness standards and/or historical data collected by the VTN provider for the purposes of assessment of an individual VTN user, or groups of VTN users. The VTN provider could then sell analytic assessment, data and/or related services to a third party for the purposes of informing the practices or behavior of the third party in relation to the VTN user or groups of users.

The virtual reality vehicle training system and platform will now be described with reference to specific examples. It will be understood that the following examples are intended to describe embodiments of the invention and are not intended to limit the invention in any way.

EXAMPLES

In one embodiment as provided by a first example, a military vehicle trainer may use the system and platform in an effort to teach and reinforce operating procedures when confronted with vehicle system malfunctions. The instructor may be a military operator of light armored vehicles (also referred to as "LAV" herein), who wants to ensure that LAV crew members are able to manage vehicle system malfunctions with respect to the vehicles principal weapon system. The VTs may occupy three crew positions within the simulated vehicle including commander, gunner, and driver. The VMs will accurately recreate the simulated controls for the commander and gunner, and will provide functional simulated controls for the driver.

The VMs, representing the control systems within the simulated vehicle, are connected to the physical environment through the simulator module of the CVTCM. Inputs from the VMs through VT engagement with the VMUI are represented within the simulated physical environment as provided by and controlled by the CVTCM. Terrain and environmental conditions within the simulated physical environment provide visual and auditory feedback to the VTs and affect the vehicle dynamics, represented as feedback to the simulated vehicle controls within the VMUI of a VM.

An instructor may create a gun misfire scenario using an instructor VM. This is represented within the VT VM on the appropriate simulated gun management interface displayed on the VMUI in the simulated vehicle VM. The VT gunner would then follow the necessary gun breech clearing procedure utilizing the appropriate simulated gun interface control system displayed on the VMUI within the simulated vehicle VM. Once the gun breech procedure is successfully executed the VT VMs and instructor VM will receive the appropriate indication within each of their respective interfaces.

The instructor may then create another scenario within their VM, one which does not require a vehicle driver VM. The instructor may select a driverless configuration using the instructor VMUI. The VMs for the gunner and commander operate normally, while the driver VM is not launched.

In another embodiment as provided by a second example, a mine operator will set an optimal vehicle passing procedures during adverse weather or night time operations. The mine operator will want to ensure that operators of heavy excavation removal vehicles are following the optimal passing procedures when encountering oncoming traffic during adverse or night time conditions. The margin of error for these large and complex vehicles may be very minimal and significant research using simulated vehicles within simulated environments is the only practical and cost effective solution for testing and determining the optimal procedures. The mine operator may pay a VTA for use of the VTN in order to simulate the scenario within the system.

The VTA using the CVTCM may simulate a number of operating scenarios. These scenarios are implemented within the physical environment portion of the simulator module. They include a replica of a currently operating mine physical environment. Night time conditions and adverse weather are included in the scenarios. Simulated vehicles and their corresponding control interfaces are recreated within the VM for VTs and displayed upon a VMUI.

The aforementioned scenario conditions, night operations and adverse weather, are presented to the VTs within the VMs through visual and auditory feedback. These scenario conditions also impact the responsiveness of the simulated vehicles and are provided as additional feedback to VTs through the appropriate input and feedback controls within the respective VMs.

At a later time, the VTA may insert an instructor VM within the scenario. An instructor may then test VTs through the instructor VM, using various mine vehicle traffic volumes and types of vehicles under various environmental conditions. Accident incidences and near-misses can be tracked using various vehicle dynamics including speed and passing directions to determine the optimal protocols with no impact to drivers and their vehicles. All results may be saved within a central vehicle training control module database to inform scenarios in the future.

In another embodiment as provided by a third example, the VTN may be made available to a mass consumer market for a monthly fee paid to a VTA. The VTA through the VTN may provide a home-based simulation driver trainer for new drivers, accessible online using a personal computer. A mother or father may have been asked by their teenage child for permission and help to acquire their driver's license. Both parents are very busy and do not have the necessary availability to provide the instructional guidance for managing various scenarios a new driver might encounter. Commercially available new driver training may not be feasible due to a lack of available options, cost, or questions regarding the quality of instruction.

Pre-determined training exercises encompassing a full-range of potential driving scenarios are made available through an easy-to-use VMUI upon a VM within the VTN. These exercises are designed to be consistent with the specific testing objectives mandated by the Ministry of Transport, or its market equivalent. A choice of simulated vehicles and their specific vehicle dynamics are offered to match the vehicle the new VT will be tested on. A full range of environmental and time-of-day conditions can be selected to increase the training challenge for the VT, such as rain, ice, fog, night time, or otherwise. These conditions impact the vehicle dynamics and responsiveness of the simulated vehicle and are provided as additional feedback to VTs through the appropriate input and feedback controls within the VM. The platform will allows for commodity controllers, such as steering wheels, accelerators, brakes, clutch pedals, or otherwise which are widely available to the average consumer, to be connected to the personal computer of the VT, and utilized as part of the VRVT.

The platform may be pre-configured to be a self-contained solution. VTs can manage their own training session's independent of a dedicated instructor VM, and the system may run automatically. The platform may score the VTs progress against government mandated training objectives and associated success criteria and will allow for after-action review indicating specific defects for further attention and practice. This information may be stored within a VM database, and communicated to a government agency once the VT has completed VRVT. The government agency may then assess this information, and if the VT meets the government mandated training objectives, the VT may be granted their drivers license.

In another embodiment as provided by a fourth example, the VTN may be used to train VTs on Light Armored Vehicles (also referred to as "LAV"s herein), specifically within the LAV-2, LAV-3, and LAV-6 families. The VTN may be used to train VTs on specific LAV vehicle components and/or equipment, which affect or are required for crew tactical and gunnery training. The LAV crew user interface may be represented as controls, indicators, and displays in the VMUI which affect or are required for crew tactical and gunnery training. The LAV instructor user interface may allow a VTA to control a simulation engine, 3-D visuals, sensory environments, audio, physics, mobility, and navigability within the VTACI.

In another embodiment as provided by a fifth example, the VTN may be used to train VTs on the use of long range guns. Current optical zoom technology prevents the use of digital technology to produce targets for the purposed of training for shooting distances larger than 150 meters (m). Optical sights (also known as scopes) used to aim a gun are so powerful at long range distances that a trainee will observe pixels on a screen if the distance of a simulated target is greater than 150 meters. The simulated image becomes largely unusable for long range shooting training. The VTN will allow a VT to train on long range shooting using digital technology to produce targets beyond 150 m. The long range shooting trainee user interface may be represented as controls, indicators, and displays in the VMUI which affect or are required for long range shooting training. The long range shooting instructor user interface may allow a VTA to control a simulation engine, 3-D visuals, sensory environments, audio, physics, mobility, and navigability within the VTACI, and to manipulate the training scenario so that the long range shooting trainee does not experience issues with observing pixilated targets when training shooting beyond 150 m.

In another embodiment as provided by a sixth example, the VRVT in combination with responsiveness measurement monitoring could be adapted for rehabilitation and restorative purposes. The VRVT could be adapted to include a simulation module that is configured to assess progress and train a VTN user who has experienced a traumatic event resulting in their inability to function properly physically or cognitively (such as with cognitive impairment resulting in confusion, memory problems, impulsiveness, distractibility, impaired judgment, inability to organize, social inappropriateness, etc.). The simulation module will be configured to recreate and represent normal physical and/or cognitive conditions within a VM, to receive and translate VTN user inputs from simulated physical/cognitive events for representation within a simulated physical environment, to receive and translate terrain and environmental conditions from within a simulated physical environment, and other functionality as would be understood by someone skilled in the art. The VTN user inputs and conditions may affect the rehabilitation scenario, and may alter the state of a VM connected to the VTN. The responsiveness measurements of the VTN user undertaking the rehabilitation scenario may be compared to the "normal" physical/cognitive responsiveness measurement standards in order to assess the VTN user progress. This comparison may also be used for diagnostic purposes or otherwise as would be understood by someone skilled in the art.

In another embodiment as provided by a seventh example, the VRVT in combination with brain wave monitoring could be adapted for risk assessment. The VRVT could be adapted to include a simulation module that is configured to assess the fitness of an elderly VTN user who is seeking to renew their driver's license. The simulation module will be configured to recreate and represent driving conditions within a VM, to receive and translate VTN user inputs from simulated driving for representation within a simulated physical environment, to receive and translate terrain and environmental conditions from within a simulated physical environment, and other functionality as would be understood by someone skilled in the art. The VTN user inputs and conditions may affect the risk assessment scenario, and may alter the state of a VM connected to the VTN. The brain waves of the VTN user undertaking the risk assessment may be compared to the "normal" driving brain wave standards in order to assess the VTN user ability to retain their driver's license. This comparison will inform the assessor's opinion related to allowing the VTN user a reissuance of their license. In performing the VTN user driving ability assessment within the VRVT environment, the assessor and the general public's safety will be maintained.

In another embodiment as provided in an eighth example, the VRVT in combination responsiveness measurement monitoring could be adapted for insurance fitness purposes. The VRVT could be adapted to include a simulation module that is configured to assess the behavior of a VTN user during job performance, such as a commercial truck driver. The simulation module will be configured to recreate and represent commercial driving conditions within a VM, to receive and translate VTN user inputs from simulated driving for representation within a simulated physical environment, to receive and translate terrain and environmental conditions from within a simulated physical environment, and other functionality as would be understood by someone skilled in the art. The VTN user inputs and conditions may affect the scenario, and may alter the state of a VM connected to the VTN. The VTN user responsiveness measurements could also be monitored during actual commercial driving. The responsiveness measurements of the VTN user undertaking the commercial driving scenario may then be compared to responsiveness measurement standards that are correlated with safe commercial driving behavior. This comparison will allow an assessment of the VTN user behavior for the purposes of drivers insurance. An insurance company could hire a VTN provider under financial conditions to be determined by the parties to provide an assessment of the VTN user. The insurance company could then use this assessment to determine more accurate insurance rates for the VTN user.

In another embodiment as provided by a ninth example, the VRVT in combination with brain wave monitoring could be adapted for diagnostic purposes. The VRVT could be adapted to include a simulation module that is configured to assess an active military VTN user on an ongoing basis. A simulation module will be configured to recreate and represent battlefield vehicle dynamics for simulated vehicles within a VM, to receive and translate VTN user inputs from simulated vehicles for representation within a simulated physical environment, to receive and translate terrain and environmental conditions from within a simulated physical environment, and other functionality as would be understood by someone skilled in the art. The VTN user inputs and conditions may affect the battlefield training scenario, and may alter the state of a VM connected to the VTN. The brain waves of the VTN user undertaking the battlefield training may be stored within a database for each time the VTN user undertakes a new training exercise. The brain waves of the VTN user may be compared to brain wave standards that are correlated with post traumatic stress disorder (PTSD), and/or their own brain waves from previous battlefield training scenarios. In this way it is possible to diagnose a VTN user with PTSD. It is also possible to detect and identify signs of PTSD at an early stage and to use that information to prevent the disorder from manifesting in the VTN user.

Figure 1:
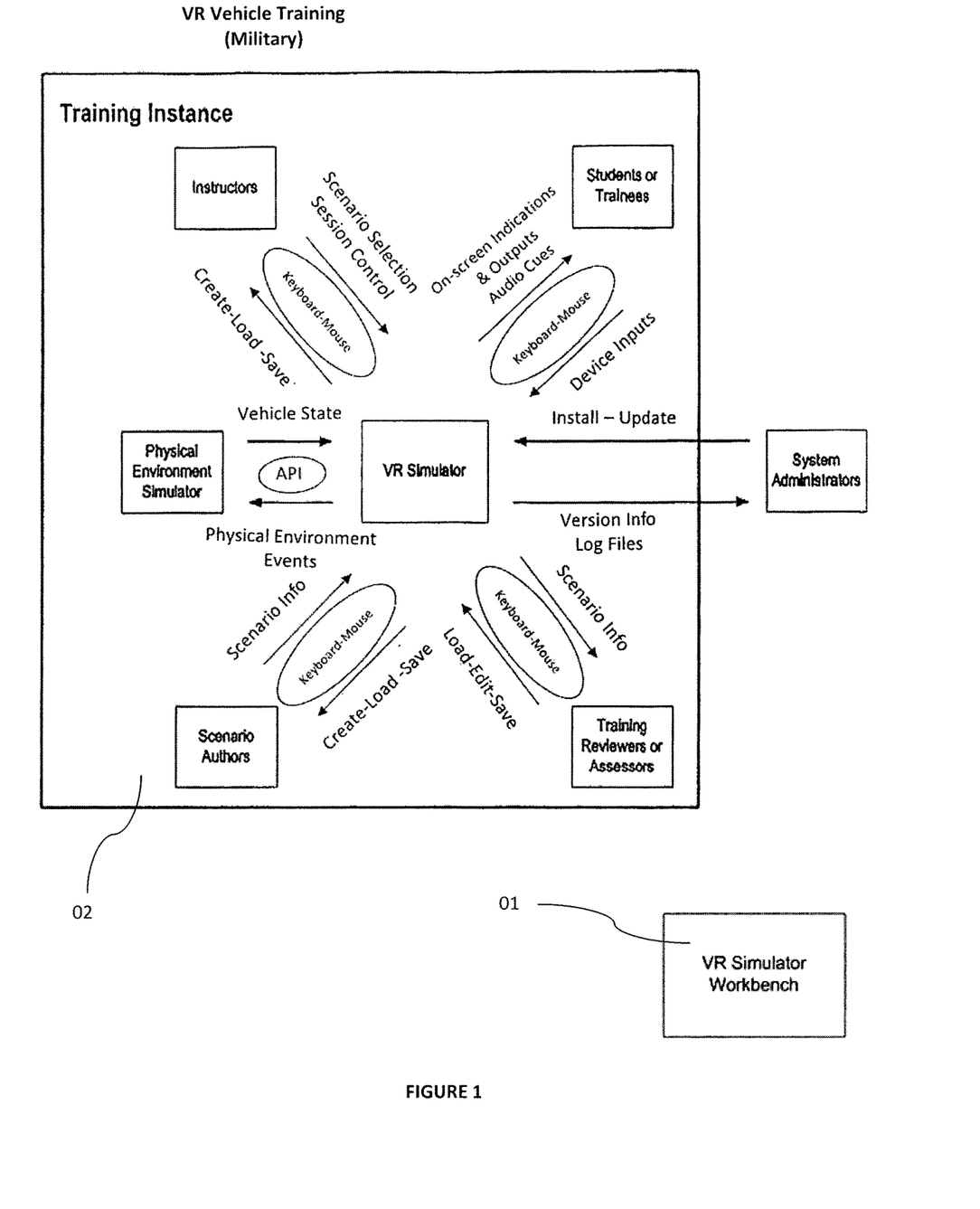
FIG. 1 illustrates the concept of a single virtual reality vehicle training platform and network for the creation of virtual reality vehicle simulators for vehicle training by use type.

In another embodiment as described in FIG. 1, the CVTCM 01 will administer and control the function of the platform and system. The CVTCM may allow for VRVT upon a VTN for military vehicles by controlling a military vehicle training instance 02. The CVTCM may also control other VRVT by implementing, controlling, monitoring and administering scenarios through other training instances such as a mining vehicle instance 03, a first responder instance 04, or an agricultural instance 05.

Figure 2:
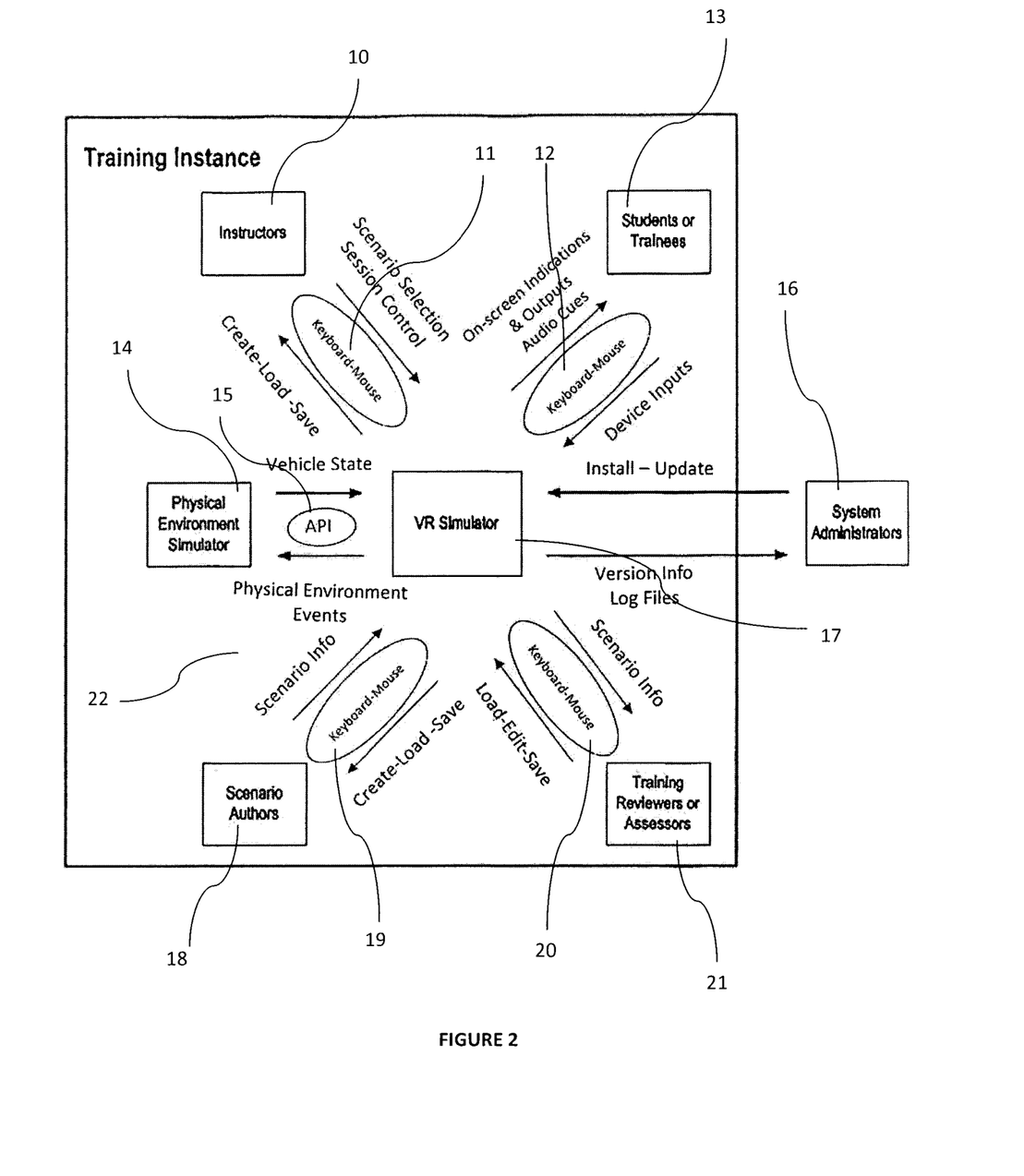
FIG. 2 illustrates a general overview of the system environment and general data flows.

In another embodiment as described in FIG. 2, a specific VRVT instance 22 is described. The VTA 16 may control a VRVT scenario physical environment 14, through a VTACI 15 and simulation module 17. An instructor VM 10 may be part of the scenario and may impact the scenario through an instructor control within an instructor VMUI 11. A VT VM 13 may be part of the scenario and may impact the scenario through a VT control within an VT VMUI 12. A third party entity scenario author may be part of the scenario through a scenario author VM 18 and may impact the scenario through a scenario author control within a scenario author VMUI 19. A third party entity assessor may be part of the scenario through an assessor VM 21 and may impact the scenario through an assessor control within an assessor VMUI 20.

Figure 3:
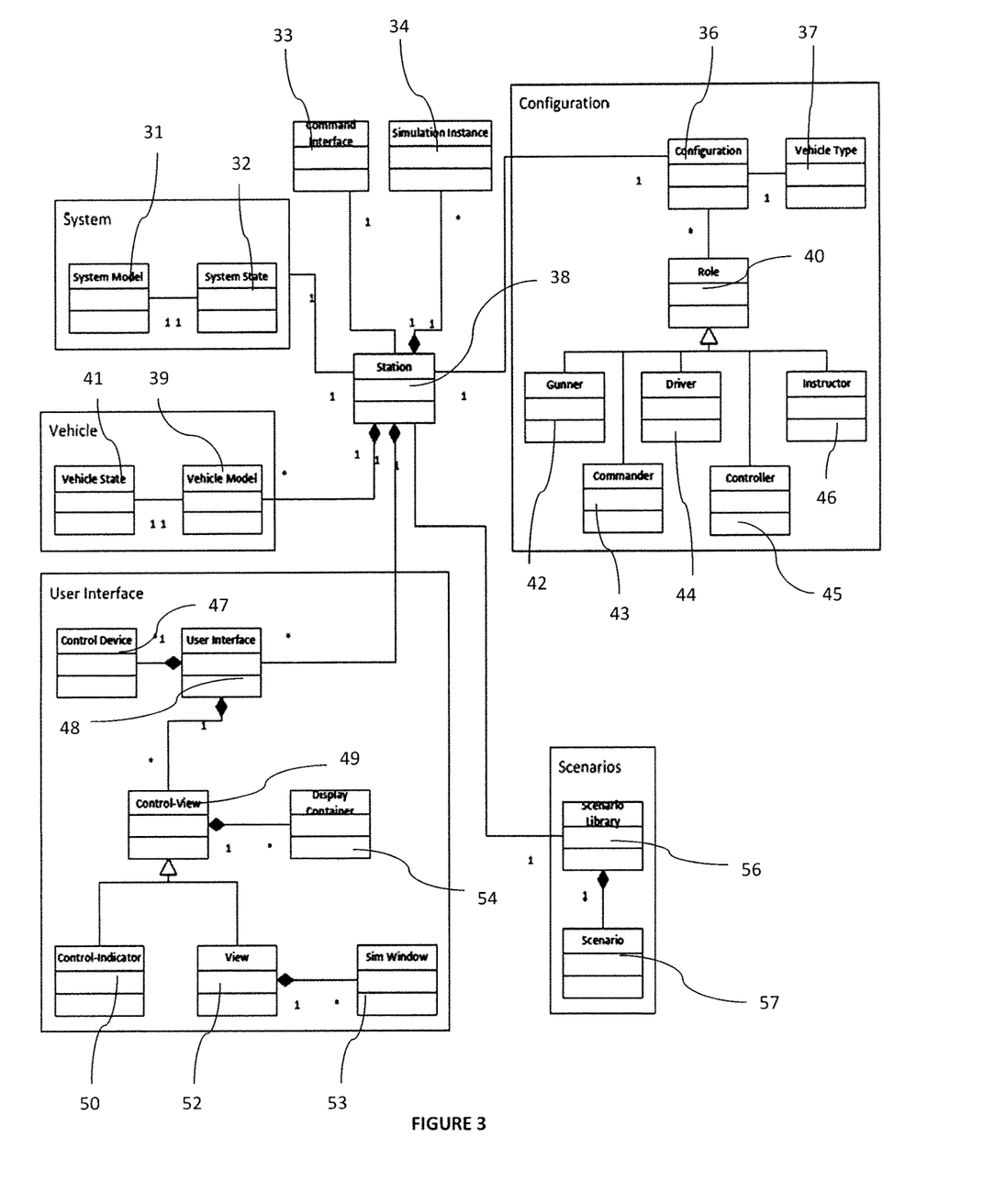
FIG. 3 illustrates a general overview of vehicle module architecture.

In another embodiment as described in FIG. 3, the schematic working of a VM 38 is described. The VM is controlled by the CVTCM through the simulation module 34 and the VTACI 33. Once the CVTCM has issued commands to the VM, it will perform various functions to implement a VRVT. It will implement configuration 36 by choosing a vehicle type 37 and determining the role 40 within the scenario. Some of the specific roles available within that scenario will include a gunner 42, a commander 43, a driver 44, a controller 45, and an instructor 46. The VM will also select the system model 31 to be used, and will monitor the system state 32. The specifics of the vehicle used for training will also be selected, including the vehicle model 39, and the state of the vehicle 41. The VM will implement a scenario by assessing the scenario library 56, and choosing a scenario 57 from that library. Finally the VM will set up and monitor the VMUI 48, which may be controlled by a specific control device 47. The control view 49 presented upon the VMUI will be projected by the display container 54 associated with the VMUI. There will be a control indicator 50 of the control view, and the specific view 52 displayed may be affected by a simulation window 53.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, personal communication device, server, PDA, or the like and pursuant to one or more, or a part of one or more, program elements, modules or objects generated from any programming language, for example but not limited to languages such as C++, Java, PL/1, or the like. In addition, each step, or a file or object or the like implementing each said step, may be executed by special purpose hardware or a circuit module designed for that purpose.

The scope of the claims should not be limited by the preferred embodiments set forth in the examples, but should be given the broadest interpretation consistent with the description as a whole.

We claim:

1. A virtual reality training system comprising:
a computing device with a microprocessor and memory, and a communication interface with a display;
a vehicle training network configured to facilitate and coordinate training on at least one of a vehicle and equipment associated with the vehicle via the communication interface, the vehicle training network comprising at least one vehicle module, a central vehicle training control module, and a vehicle training administrator control interface, wherein the at least one vehicle module and the central vehicle training control module are software codes that are loaded into the memory and executed by the microprocessor of the computing device;
at least one centralized vehicle training control module database with corresponding memory, configured to store information related to the central vehicle training control module and the vehicle training network; wherein a trainee employing the virtual reality training system is trained with respect to a specific role-based position, the specific role-based position associated with a vehicle and defining equipment within the vehicle upon which the trainee is to be trained;
the at least one vehicle module is configured to represent the specific role-based position a trainee is being trained on where the at least one vehicle module is configured to:
communicate within the vehicle training network;
manage and facilitate training of the trainee in the specific role-based position by rendering a simulated physical environment associated with the specific role-based position to the trainee upon one or more displays; and
receive inputs from one or more electronic devices associated with the trainee;
a vehicle module database with corresponding memory and in electronic communication with the at least one vehicle module configured to store information related to the at least one vehicle module;
the central vehicle training control module is configured to facilitate the sharing of resources within the vehicle training network, capable of communication within the vehicle training network, and configured to allow for participation of at least one vehicle module within the vehicle training network, and configured to:
recreate and represent vehicle and equipment behaviour for the vehicle and equipment associated with the specific role-based position within the at least one vehicle module;
receive and translate the inputs generated by the trainee from the at least one vehicle module;
generate the simulated physical environment associated with the specific role-based position of the at least one vehicle module in dependence upon the received and translated inputs and a simulated environment; and
establish and translate terrain data and environmental data into the simulated environment where the terrain data is established in dependence upon motion of a vehicle associated with the specific role-based position established in dependence upon at least one of other inputs from another vehicle module associated with another specific role-based position for the vehicle and actions of an administrator via the vehicle training administrator control interface and the environmental data is established in dependence upon other actions of the administrator via the vehicle training administrator control interface;
the vehicle training administrator control interface is configured to facilitate configuration of the vehicle training network; and
the vehicle training administrator can configure, access, engage with, and control the at least one central vehicle training control module.

2. The virtual reality training system according to claim 1, wherein
the specific role-based position is associated with an item of equipment associated with a vehicle; and
the vehicle is selected from the group comprising an emergency service vehicle, a mining vehicle, an agricultural vehicle, and a construction vehicle.

3. The virtual reality training system according to claim 1, wherein
the at least one vehicle module is one of a set of vehicle modules;

the set of vehicle modules are associated with a specific vehicle; and at least one of:
- each vehicle module within the set of vehicle modules represents a different specific role-based position within the specific vehicle; and
- each vehicle module within the set of vehicle modules represents a different specific role-based position within the specific vehicle; and
- each vehicle module within the set of vehicle modules presents controls and views associated with the specific role-based position within the specific vehicle for that vehicle module of the set of vehicle modules to a vehicle trainee using the virtual reality training system.

4. The virtual reality training system according to claim 1, wherein
- the at least one vehicle module is configured to accommodate a vehicle training instructor in addition to a vehicle trainee using the virtual reality training system for training;
- the at least one vehicle module contains a plurality of simulated environment scenarios and allows the virtual training instructor to execute a simulated environment scenario of the plurality of simulated environment scenarios.

5. The virtual reality training system according to claim 1, wherein
- the at least one vehicle module is configured to accommodate a third party in addition to a vehicle trainee using the virtual reality training system for training; and
- the third party is selected from the group comprising scenario author and a government body.

6. The virtual reality training system according to claim 1, wherein
- a vehicle module user interface creates a command interface for a vehicle trainee using the virtual reality training system for training allowing the virtual trainee to:
  - listen for commands from other users of the vehicle training network (VTN) users; and
  - send their own commands to the other users of the vehicle training network; wherein
- the commands sent and received through the vehicle module user interface employ a computer network protocol which is both computer language agnostic and system application agnostic; and
- the computer network protocol is employed in all instances of the vehicle training network for any type of vehicle or equipment and for all scenarios being presented to the virtual trainee.

7. The virtual reality training system according to claim 1, wherein
- the central vehicle training control module references a scenario mission file, a system configuration, and a vehicle state of a vehicle;
- the scenario mission file contains all the information required for the virtual reality training system to generate the simulated environment presented to a vehicle trainee using the virtual reality training system and comprises:
  - terrain information;
  - environmental effects;
  - time of day;
  - locations of all objects within the simulated environment;
  - locations of the vehicle and all other vehicles within the simulated environment; and
  - locations of all avatars in the simulated environment.

8. The virtual reality training system according to claim 1, wherein
- the central vehicle training control module receives a scenario from another vehicle module;
- the another vehicle module is associated with an instructor role within the virtual reality training system; and
- the central vehicle training control module launches all vehicle modules associated within the scenario associated with virtual trainees using the virtual reality training system.

9. The virtual reality training system according to claim 1, wherein
- the central vehicle training control module automatically executes a scenario;
- the central vehicle training control module launches all vehicle modules associated within the scenario associated with virtual trainees using the virtual reality training system; and
- the central vehicle training control module maintains all state information of the scenario in a single location.

10. The virtual reality training system according to claim 1, wherein
- the virtual reality training system further comprises a responsiveness monitoring system;
- the responsiveness monitoring system assesses a virtual trainee employing the virtual reality training system in dependence upon a series of responsiveness measurements of the virtual trainee to establish a characteristic of the virtual trainee; and
- the characteristic is selected from the group comprising a behavioral risk associated with the virtual trainee operating the type of vehicle or equipment, a reaction of the virtual trainee to a specific scenario, an insurance risk associated with the virtual trainee and a financial risk associated with the virtual trainee.

11. The virtual reality training system according to claim 1, wherein
- the virtual reality training system further comprises a responsiveness monitoring system;
- the responsiveness monitoring system assesses a virtual trainee employing the virtual reality training system in dependence upon a series of responsiveness measurements of the virtual trainee to establish a characteristic of the virtual trainee;
- the characteristic is selected from the group comprising a behavioral risk associated with the virtual trainee operating the type of vehicle or equipment, a reaction of the virtual trainee to a specific scenario, an insurance risk associated with the virtual trainee and a financial risk associated with the virtual trainee; and
- the series of responsiveness measurements are selected from the group comprising a hand speed of the virtual trainee, movements of the virtual trainee, a movement bias of the virtual trainee, a movement time of the virtual trainee, a pupil dilation of the virtual trainee, a posture of the virtual trainee, a brain wave characteristic of the virtual trainee, and perspiration of the virtual trainee.

12. The virtual reality training system according to claim 1, wherein
- the virtual reality training system further comprises a responsiveness monitoring system;
- the responsiveness monitoring system assesses a virtual trainee employing the virtual reality training system in dependence upon a series of responsiveness measurements of the virtual trainee and a responsiveness standard to establish an assessment of the virtual trainee; and the assessment is selected from the group comprising a behavioral risk associated with the virtual trainee operating the type of vehicle or equipment, a reaction of the virtual trainee to a specific scenario, an insurance risk associated with the virtual trainee and a financial risk associated with the virtual trainee;

the responsiveness standard is one of:
an existing responsiveness standard;
historical responsiveness data collected by the responsiveness monitoring system; and
a responsiveness standard developed by the responsiveness monitoring system; and the assessment of the virtual trainee is associated with an activity selected from the group comprising rehabilitation, diagnosis, risk assessment, cognitive assessment, determining insurance fitness, and social interaction.

13. The virtual reality training system according to claim 1, wherein the virtual reality training system further comprises a responsiveness monitoring system;

the responsiveness monitoring system assesses a virtual trainee employing the virtual reality training system in dependence upon a series of responsiveness measurements of the virtual trainee and a responsiveness standard to establish an assessment of the virtual trainee; and the assessment is selected from the group comprising a behavioral risk associated with the virtual trainee operating the type of vehicle or equipment, a reaction of the virtual trainee to a specific scenario, an insurance risk associated with the virtual trainee and a financial risk associated with the virtual trainee;

the responsiveness standard is one of:
an existing responsiveness standard;
historical responsiveness data collected by the responsiveness monitoring system; and
a responsiveness standard developed by the responsiveness monitoring system;

the assessment of the virtual trainee is associated with an activity selected from the group comprising rehabilitation, diagnosis, risk assessment, cognitive assessment, determining insurance fitness, and social interaction; and the series of responsiveness measurements are selected from the group comprising a hand speed of the virtual trainee, movements of the virtual trainee, a movement bias of the virtual trainee, a movement time of the virtual trainee, a pupil dilation of the virtual trainee, a posture of the virtual trainee, a brain wave characteristic of the virtual trainee, and perspiration of the virtual trainee.

14. The virtual reality training system according to claim 1, wherein the virtual reality training system further comprises a responsiveness monitoring system;

the responsiveness monitoring system assesses a virtual trainee employing the virtual reality training system in dependence upon a series of responsiveness measurements of the virtual trainee and a responsiveness standard to establish an assessment of the virtual trainee;

the responsiveness standard is one of:
an existing responsiveness standard;
historical responsiveness data collected by the responsiveness monitoring system; and
a responsiveness standard developed by the responsiveness monitoring system; and the responsiveness monitoring system comprises a non-invasive brain-computer interface comprising at least one of an electroencephalography based brain-computer interface and a non-electroencephalography based brain-computer interface.

15. The virtual reality training system according to claim 1, wherein the virtual reality training system is configured to add an instructor vehicle module to accommodate a vehicle training instructor in addition to the at least one vehicle module for at least one vehicle trainee using the virtual reality training system for training;

the instructor vehicle module enables the testing of the at least one vehicle trainee using a range of vehicle traffic volumes and types of vehicles under a range of environmental conditions;

accident incidences and near-misses are tracked by the virtual reality training system to determine protocols with no impact to drivers and their vehicles; and all results are stored with a database accessible to the central vehicle training control module and employed by the central vehicle training control module to configure one or more future scenarios.

16. The virtual reality training system according to claim 1, wherein the virtual reality training system is configured to add an instructor vehicle module to accommodate a vehicle training instructor in addition to the at least one vehicle module for at least one vehicle trainee using the virtual reality training system for training;

the instructor vehicle module enables the testing of the at least one vehicle trainee using a range of vehicle traffic volumes and types of vehicles under a range of environmental conditions;

accident incidences and near-misses are tracked by the virtual reality training system in dependence upon vehicle dynamics during a simulation to determine protocols with no impact to drivers and their vehicles; and all results are stored with a database accessible to the central vehicle training control module and employed by the central vehicle training control module to configure one or more future scenarios.

17. The virtual reality training system according to claim 1, wherein the virtual reality training system is configured to add an instructor vehicle module to accommodate a vehicle training instructor in addition to the at least one vehicle module for at least one vehicle trainee using the virtual reality training system for training;

the instructor vehicle module enables the testing of the at least one vehicle trainee using a range of vehicle traffic volumes and types of vehicles under a range of environmental conditions;

accident incidences and near-misses are tracked by the virtual reality training system in dependence upon vehicle dynamics during a simulation to determine protocols with no impact to drivers and their vehicles;

all results are stored with a database accessible to the central vehicle training control module and employed by the central vehicle training control module to configure one or more future scenarios; and the vehicle dynamics are at least one of speed and passing direction.

18. The virtual reality training system according to claim 1, wherein
the virtual reality training system is configured to add an instructor vehicle module to accommodate a vehicle training instructor in addition to the at least one vehicle module for at least one vehicle trainee using the virtual reality training system for training;
the instructor vehicle module enables the instructor to execute a scenario to the virtual trainee comprising a failure with respect to a type of equipment associated with the at least one vehicle module.

19. The virtual reality training system according to claim 1, wherein
the at least one vehicle module is one of a set of vehicle modules;
the set of vehicle modules are associated with a specific vehicle;
each vehicle module within the set of vehicle modules represents a different specific role-based position within the specific vehicle;
the virtual reality training system is configured to add an instructor vehicle module to accommodate a vehicle training instructor in addition to the at least one vehicle module for at least one vehicle trainee using the virtual reality training system for training;
the instructor vehicle module enables the instructor to execute a scenario comprising a failure with respect to a type of equipment associated with specific role-based position within the specific vehicle.

20. The virtual reality training system according to claim 1, wherein
an administrator via the vehicle training administrator control interface can configure a driverless training session of the vehicle;
the at least one vehicle module is one of a plurality of vehicle modules configured for the driverless training session;
the at least one vehicle module is associated with the specific role-based position for which the trainee is being trained;
each other vehicle module of the plurality of vehicle modules is associated within another specific role-based position of the vehicle; and
a vehicle module associated with a driver of the vehicle is not launched by the vehicle training network.

* * * * *